United States Patent [19]

Kumar et al.

[11] Patent Number: 5,065,107

[45] Date of Patent: Nov. 12, 1991

[54] PHASE-LOCKED LOOP BANDWIDTH SWITCHING DEMODULATOR FOR SUPPRESSED CARRIER SIGNALS

[75] Inventors: Surinder Kumar; Gerald Harron, both of Saskaton, Canada

[73] Assignee: University of Saskatchewan, Canada

[21] Appl. No.: 511,069

[22] Filed: Apr. 19, 1990

[51] Int. Cl.$^5$ .................. H04L 27/22; H03L 7/093
[52] U.S. Cl. ..................... 329/308; 375/81; 375/83; 375/97; 375/120; 331/12
[58] Field of Search ............... 329/306–309, 329/346; 331/12; 375/81, 83, 84, 97, 119, 120; 455/260

[56] References Cited

U.S. PATENT DOCUMENTS

| | | | |
|---|---|---|---|
| 3,461,388 | 8/1969 | Daley. | |
| 3,974,333 | 8/1976 | May, Jr. et al. | 328/155 X |
| 3,983,501 | 9/1976 | Lindstrum | 329/307 |
| 3,984,778 | 10/1976 | Bhopale. | |
| 4,205,272 | 5/1980 | Kumagai | 455/83 |
| 4,215,239 | 7/1980 | Gordy et al. | 375/114 |
| 4,243,941 | 1/1981 | Zdunek | 329/309 |
| 4,409,562 | 10/1983 | Kurihara | 331/1 A |
| 4,642,573 | 2/1987 | Noda et al. | 375/77 X |

Primary Examiner—Siegfried H. Grimm
Attorney, Agent, or Firm—Davis, Bujold & Streck

[57] ABSTRACT

A receiver for tracking a carrier suppressed phase-shifted input signal comprises a phase-locked loop circuit for receiving the input signal and having a variable frequency oscillator responsive to a control signal for oscillating at a frequency corresponding to an intermediate frequency and a frequency difference detector for producing an output signal indicative of the frequency difference between the frequency of the input signal and the intermediate frequency, a feedback loop network having a narrow-band path and a wide-band path and being responsive to the detector output signal for producing the control signal and applying the control signal to the oscillator through one of the paths whereby to change the intermediate frequency of the oscillator in response to the control signal, a quality detector responsive to the detector output signal for producing a signal corresponding to the bit error rate of the input signal; and selection means responsive to the bit error rate signal for causing the control signal to pass through the narrow-band path when the bit error rate signal is below a predetermined threshold and through the wide-band path when the bit error rate signal exceeds the predetermined threshold.

23 Claims, 1 Drawing Sheet

PHASE-LOCKED LOOP BANDWIDTH SWITCHING DEMODULATOR FOR SUPPRESSED CARRIER SIGNALS

BACKGROUND OF THE INVENTION

This invention finds use in digital radio communications systems where the receive signal demodulator oscillator is phase synchronized with the transmitter oscillator. It is particularly well suited to obtaining fast synchronization or locking and subsequently maintaining lock in the presence of burst noise and when the received power level is very low, that is where the receive signal power level is very near to a minimum Carrier to Noise (C/N) ratio that is needed for communications to occur. Such conditions occur in communications systems using satellite communications technology; in distant radio communications where transmitter power is either expensive to provide, such as in a remote location, or is limited by spectrum licensing or regulation to a maximum power level; and in fibre optic communication where maximum distances between repeater sites is needed (e.g. undersea cables).

A problem in modern digital communications is knowing when the demodulator is in and out of lock with the transmitter. Knowing the lock condition enables the designer to implement bandwidth switching in the demodulator to help incorporate fast locking (wide bandwidth) and secure locking (narrow bandwidth). Present lock detect circuits are incorporated at the IF demodulator, and have problems of cost, implementation, and reliability in low C/N operation.

When the communications signal is encoded with forward error correction, it is possible to implement a lock detect circuit based upon the quality of the received data. This method of obtaining bandwidth switching provides several benefits:

high reliability based on the received data;

a digital implementation which is simple and cost effective;

separate digitally setable wide-to-narrow and narrow-to-wide thresholds;

bandwidth switching which is cycle slip resistant.

SUMMARY OF THE INVENTION

The present invention relates generally to a novel apparatus and method for switching a phase-locked loop demodulator feedback loop bandwidth from wide-band to narrow-band based on the bit error rate of the received signal.

In one of its aspects, the invention provides a receiver for tracking a carrier suppressed phase-shifted input signal comprises a phase-locked loop circuit for receiving the input signal and having a variable frequency oscillator responsive to a control signal for oscillating at a frequency corresponding to an intermediate frequency and a frequency difference detector for producing an output signal indicative of the frequency difference between the frequency of the input signal and the intermediate frequency, a feedback loop network having a narrow-band path and a wide-band path and being responsive to the detector output signal for producing the control signal and applying the control signal to the oscillator through one of the paths whereby to change the intermediate frequency of the oscillator in response to the control signal, a quality detector responsive to the detector output signal for producing a signal corresponding to the bit error rate of the input signal; and selection means responsive to the bit error rate signal for causing the control signal to pass through the narrow-band path when the bit error rate signal is below a predetermined threshold and through the wide-band path when the bit error rate signal exceeds the predetermined threshold.

In another of its aspects, the present invention provides a method of communicating digitally encoded information by a carrier suppressed electromagnetic transmission including the steps of:

a. encoding the information to be transmitted with redundant bits in accordance with a selected algorithm;

b. producing a frequency-variable recovered carrier signal from the received transmission using a closed-loop Costas loop demodulator having at least two feed-back loop paths of different bandwidth;

c. multiplying the received transmission with the recovered carrier signal to recover the modulating signal;

d. processing the recovered modulating signal to determine the digital information encoded therein including the redundant bits;

e. decoding the digital information by computing the redundant bit algorithm to produce a bit error signal;

f. counting the bit error signals; and g. selecting one of the feed-back loop paths at predetermined count thresholds within a selected time interval.

DETAILED DESCRIPTION

Figure 1:
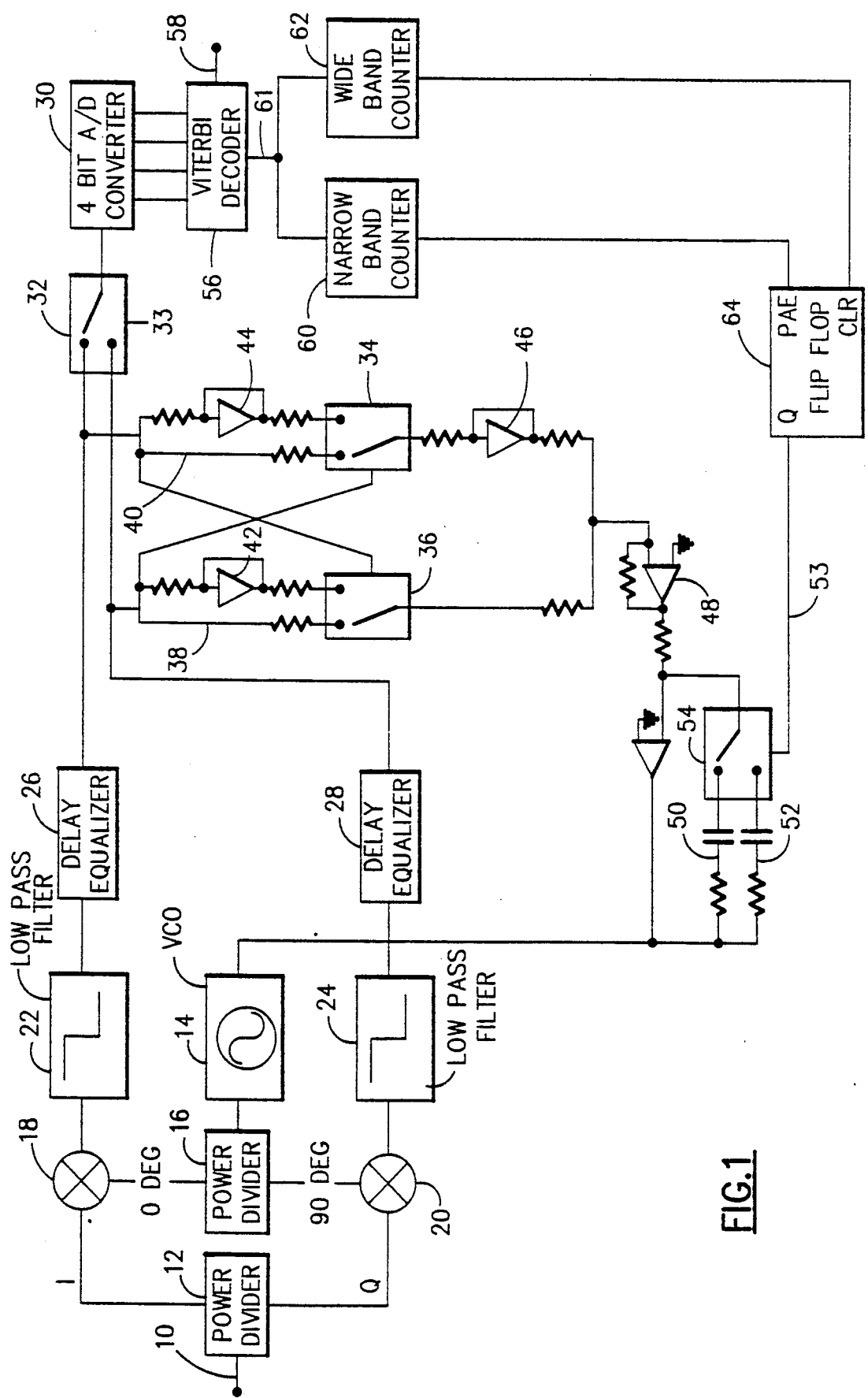
FIG. 1 shows in functional block diagram form a receiver incorporating the features of the invention.

The demodulator of the receiver system decodes information modulated onto a carrier signal using Quadrature Phase Shift Keying (QPSK). A known demodulator for demodulating such a signal is referred to as a Costas loop. The Costas loop implementation of a QPSK demodulator in accordance with the present invention is shown in the attached FIG. 1. As shown in this figure, the demodulator input intermediate frequency (IF) signal at point 10 is power divided into a phase (0°) I signal and quadrature (90°) Q signal by power divider 12. A voltage controlled crystal oscillator (VCXO) 14 is used as a VCO in the carrier recovery loop. For example, a 10.7 MHz VCXO can be used to match the IF frequency used in the receiver RF/IF stage. The VCXO output is power divided by power divider 16 into a phase (0°−I) and quadrature (90°−Q) signal in the same fashion as the input IF signal was. The 10.7 MHz 0° and 90° signals are multiplied by the 10.7 MHz input intermediate frequency IF signals by multipliers 18 and 20. The multiplier outputs are low pass filtered using, for example, a 40 KHz wide low-pass filters 22 and 24. The resultant filtered signals are group delay-equalized by delay equalizers 26 and 28 to remove any phase-delay distortion which is introduced into the 0-40 KHz frequency range by the low-pass filters 22 and 24.

A four bit Analog to Digital (A/D) converter 30 is used to obtain the four bit A/D decoding of the I and Q signals. The decoding is 1 bit for sign and 3 bits for magnitude. In the illustrated embodiment, a single A/D converter is multiplexed between the I and Q channel by analog switch 32 to allow one A/D converter to be used for both channels. The switching of the A/D converter from the I channel to the Q channel is controlled by a clocking derived from the recovered carrier which is counted down to a switching pulse at control point 33. This switching pulse allows both the I and Q sample to be taken by the A/D converter for each data element that is received. It will be understood that it is possible to implement the circuit using 2 A/D converters, 1 for the I channel and another for the Q channel.

Now looking at the feedback loop of the decoder. The I and Q channel analog signals are selected in-phase or 180° phase by the sign bit of the other channel. The in-phase and 180° phase switching is done by means of the cross-sampling of the I and Q channels. The so sampled signal is used to control analog switch 34 or 36 (one being provided for each channel) which switch takes the I or Q channel signal directly on paths 38 or 40 or through an inverter 42 or 44. The two thusly-switched outputs are subtracted (by passing the switched I channel analog signal through inverter 46 and summing the two channels using Op-Amp 48 and low-pass filtered by means of Op-amp feedback path 50 or 52 to obtain the feedback control voltage signal for the carrier VCXO. The selection of a wide-band feedback path 50 at 0.9% of the symbol rate, or coded data rate, or a narrow-band feedback path 52 at 0.2% of the symbol rate is made by analog switch 54 which is operated in the manner described below. It is the selection of one or the other of these feedback paths which determines the closed-loop demodulator bandwidth as being either narrower or wider. As the loop signal to noise (SNR) ratio improves with a narrowing of the demodulator feed-back loop bandwidth, a narrower demodulator bandwidth allows a locked signal to be decoded with better reliability. These processing circuits in the Costas loop remove the modulating data and generate a frequency control voltage thus resulting in automatic frequency control (AFC) action of the VCXO 14. The locked (narrow-band mode) feedback-loop filter bandwidth is designed to be about 0.2 percent of the symbol rate of the transmission. The symbol rate would be 2 or 3 times the data transmission rate depending on whether rate $\frac{1}{2}$ or rate $\frac{1}{3}$ convolution encoding is performed on the transmitted data. An example data transmission rate would be 56 Kilo Bits per second (KBps). The loop is initially in a wide-band mode which is preferably approximately 0.9 percent of the symbol rate, to enable the receiver to quickly settle into a locked state. Once a locked state has been achieved, the analog switch 54 is set by control line 53 to the narrow-band mode to make the receiver more noise-immune. The bandwidth of these filters determines the receiver system close-loop noise bandwidth and the switching of this bandwidth from wide (out-of-lock) to narrow (in-lock) will be explained later.

The Viterbi Decoder 56 is an off-the-shelf single LSI chip, as for example the ST-2010 VITERBI DECODER manufactured by Stanford Telecommunications Inc. of Santa Clara, Calif., which takes in the 4 bit parallel I and Q samples provided by the A/D converter 30 and produces a data stream out. The 4 bit I and Q channel data is input into the decoder chip. The decoder 56 may lock into one of the four QPSK phases, namely: 0°, 90°, 180°, or 270°. Two of these phases provide the data sought. The first phase, at 0°, is the desired phase to lock into. The second desirable phase, at 180°, just inverts the data and the differential encoding and decoding of the data takes care of this ambiguity. If the loop locks into one of the other two phases (90° or 270°), the I and Q inputs have to be swapped. This swapping is done if the data quality output shows a poor data quality for a time exceeding a preset interval.

The indicated decoder chip requires a clock signal which is 80-140 times the symbol rate. As an illustration, a 7.168 MHz VCXO (not shown) at 128 times the symbol rate is used to generate this clock signal for the decoder chip. This VCXO is locked to the data clock using a bit synchronizer circuit (not shown). Differential decoding of the data is carried out inside the chip. A V.35 descrambler (not shown) could be used at the decoder output 58 to descramble the data, assuming it was scrambled at transmission by a V.35 scrambler, which is the preferred way of scrambling the transmitted signal. The 56 Kbps descrambled data output from the V.35 decoder may then be fed into a mux (not shown).

When the receiver demodulator is first powered up, it must become phase synchronized with the transmitter. To become synchronized quickly, it is desirable to have the receiver VCXO control loop have a wide bandwidth. Once synchronized, it is desirable to have the receiver VCXO control loop have a narrow bandwidth making the receiver less likely to get out of synchronization with the transmitter owing to burst noise or cycle slip (i.e. moving 90° into a different quadrature, that is from 0° to 90° etc.).

The convolution encoding used in the present system provides extra coding bits which are decoded out during the Viterbi decoding process by the decoder 56. The extra coding bits are checked using a decoding algorithm during the Viterbi decoding process to check on receive data integrity. The use of the decoding algorithm allows the Viterbi decoder to determine if any bit errors have occurred in the inbound data. As errors occur they are signalled on data quality line 61 which is fed into counters 60 and 62. When an error rate below a threshold error rate is achieved over a fixed period of time, it is known that the demodulator is in lock. It is desirable at this time to reduce the locking bandwidth of the demodulator to maintain the locked state. Once the demodulator is in narrow-band mode, the phase locked loop of the demodulator is not capable of rapid movement in the frequency domain.

In the preferred embodiment of the invention, the wide-band narrow-band state of the phase locked loop is controlled by flip flop 64 the output of which is used to activate analogue switch 54 through use of control line 53.

When the decoder is in wide-band mode, for example when the demodulator is just turned on or is attempting to resynchronize, narrow-band counter 60 counts the errors coming from the Viterbi Decoder 56 to determine if they are smaller than a specified count in a given time-frame. For example at a data rate of 56 kilobits per second, a threshold of less than 32 errors in a block of 4096 bits. If such a threshold is achieved, then narrow band counter 60 activates the PREset line of flip flop 64 causing it to place a voltage representing logical "1" on output "Q" which activates analogue switch 54 to place the narrow-band feedback path 52 into the feedback loop of the decoder. If the threshold is reached before the end of a block of 4096 bits (i.e. more than 32 errors were counted), the narrow-band counter simply resets to zero and the counting resumes for the next block of 4096 bits.

When the decoder is in narrow-band mode, wide-band counter 62 counts the errors coming from the Viterbi Decoder 56 to determine if they are greater than a specified count in a given time-frame. For example at a data rate of 56 kilobits per second, a threshold of more than 2048 errors in a block of 131,072 bits. If such a threshold is achieved, then wide-band counter 62 activates the CLeaR line of flip flop 64 causing it to place a voltage representing logical "0" on output "Q" which activates analogue switch 54 to place the wide-band feedback path 50 into the feedback loop of the decoder. If the threshold is not reached at the end of the block of 131,072 bits (i.e. less than 2048 errors were counted), the wide-band counter simply resets to zero and the counting resumes for the next block of 131,072 bits.

As may be appreciated, the narrow-band and wide-band thresholds may be varied to suit the needs of the communications system employing this method of loop-bandwidth control. As the counters 60 and 62 are any suitable counter, for example 74HC4040 12 bit counters produced by Texas Instruments, any desired error rate may be selected by choosing the desired count lead out of the counter chip. If more than a 12 bit count is required (i.e. more than 2048), higher values may be obtained by staging 2 or more counters together using configurations well known to one skilled in the art.

When in locked state, the demodulator control circuit responds to errors from the decoder by treating the errors as simply a burst of errors caused by a noise burst. The demodulator remains in narrow-band mode. Should the error rate persist, the Viterbi decoder chip 58 responds by treating the errors as a cycle-slip and the I and Q channel data into the decoder are swapped and the demodulator remains in narrow-band mode. Should the error rate persist past a second setable threshold, the demodulator loop control circuit wide-band counter 62 is triggered. This results in the loop-control circuit switching the loop feedback filter into wide-band mode by causing flip flop 64 to be set. This in turn causes analog switch 54 to connect wide-band path 52 to be used as the feed back path in place of narrow-band path 50. Thus the carrier recovery loop responds by treating the errors as caused by loss of synchronization with the transmitter and the demodulator is switched into wide-band mode to more quickly re-establish synchronization with the transmitter.

From the foregoing description, it will be apparent that there has been provided an improved phase lock loop receiver having a switchable feed back loop filter controlled by the error rate of the received signal. Naturally, the system has been described in simplified form for clarity of description and exposition of the invention. Additions, variations and modifications of the system described herein will occur to those skilled in the art and are intended to be within the scope of the invention as recited in the claims appended hereto.

The embodiments of the invention in which an exclusive property or privilege is claimed are defined as follows:

1. A receiver for tracking a carrier suppressed phase-shifted input signal comprising:
   (a) a phase-locked loop circuit for receiving said input signal and having a variable frequency oscillator responsive to a control signal for oscillating at a frequency corresponding to an intermediate frequency and a frequency difference detector for producing an output signal indicative of the frequency difference between the frequency of said input signal and said intermediate frequency;
   (b) a feedback loop network having a narrow-band path and a wide-band path and being responsive to said detector output signal for producing said control signal and applying said control signal to said oscillator through one of said paths whereby to change the intermediate frequency of said oscillator in response to said control signal;
   (c) a quality detector responsive to said detector output signal for producing a signal corresponding to the bit error rate of said input signal; and
   (d) selection means responsive to said bit error rate signal for causing said control signal to pass through said narrow-band path when said bit error rate signal is below a predetermined threshold and through said wide-band path when said bit error rate signal exceeds said predetermined threshold.

2. A receiver as claimed in claim 1 wherein said circuit comprises a Costas loop demodulator.

3. A receiver as claimed in claim 1 wherein said quality detector comprises:
   a received signal decoder for processing encoded binary data according to an error correction scheme;
   a bit error signalling means for producing a signal corresponding to a detected bit error;
   a first counter for counting bit errors over a block of received bits;
   a second counter for counting bit errors over a second block of received bits where said second block of received bits is larger than said first block of bits;
   means for producing a received data quality signal corresponding to the bit counts of said first and second counters.

4. A receiver as claimed in claim 3 wherein said first block of bits is at least 1024 bits and said second block of bits is at least 5 times the number of bits contained in said first block.

5. A receiver as claimed in claim 3 wherein said error correction scheme is convolution encoding with Viterbi decoding.

6. A receiver as claimed in claim 2 wherein said quality detector comprises:
   a received signal decoder for processing encoded binary data according to an error correction scheme;
   a bit error signalling means for producing a signal corresponding to a detected bit error;
   a first counter for counting bit errors over a block of received bits;
   a second counter for counting bit errors over a second block of received bits where said second block of received bits is larger than said first block of bits;
   means for producing a received data quality signal corresponding to the bit counts of said first and second counters.

7. A receiver as claimed in claim 6 wherein said first block of bits is at least 1024 bits and said second block of bits is at least 5 times the number of bits contained in said first block.

8. A receiver as claimed in claim 7 wherein said error correction scheme is convolution encoding with Viterbi decoding.

9. A receiver for tracking a carrier suppressed phase-shifted input signal comprising:
   (a) a phase-locked loop circuit for receiving said input signal and having a variable frequency oscillator responsive to a control signal for oscillating at a frequency corresponding to an intermediate frequency and a frequency difference detector for producing an output signal indicative of the frequency difference between the frequency of said input signal and said intermediate frequency;

(b) a feedback loop network having a narrow-band path and a wide-band path and being responsive to said detector output signal for producing said control signal and applying said control signal to said oscillator through one of said paths whereby to change the intermediate frequency of said oscillator in response to said control signal;

(c) a quality detector responsive to said detector output signal for producing a signal corresponding to the bit error rate of said input signal having:

a signal decoder for processing encoded binary data according to an error correction scheme;

bit error signalling means for producing a signal corresponding to a detected bit error; a first counter for counting bit errors over a first block of received bits;

a second counter for counting bit errors over a second block of received bits where said second block of received bits is larger than said first block of bits; and means responsive to the bit counts of said first and second counters for producing a received data quality signal; and (d) selection means responsive to said received data quality signal for causing said control signal to pass through said narrow-band path when said bit error rate signal is below a predetermined threshold and through said wide-band path when said bit error rate signal exceeds said predetermined threshold.

10. A receiver as claimed in claim 9 wherein said circuit comprises a Costas loop demodulator.

11. A receiver as claimed in claim 9 wherein said first block of bits is at least 1024 bits and said second block of bits is at least 5 times the number of bits contained in said first block.

12. A receiver as claimed in claim 9 wherein said error correction scheme is convolution encoding with Viterbi decoding.

13. A receiver as claimed in claim 10 wherein said first block of bits is at least 1024 bits and said second block of bits is at least 5 times the number of bits contained in said first block.

14. A receiver as claimed in claim 13 wherein said error correction scheme is convolution encoding with Viterbi decoding.

15. A receiver as claimed in claim 10 wherein said error correction scheme is convolution encoding with Viterbi decoding.

16. A method of communicating digitally encoded information by a carrier suppressed electromagnetic transmission including:

(a) encoding the information to be transmitted with redundant bits in accordance with a selected algorithm;

(b) producing a frequency-variable recovered carrier signal from the received transmission using a closed-loop Costas loop demodulator having at least two feed-back loop paths of different bandwidth;

(c) multiplying the received transmission with said recovered carrier signal to recover the modulating signal;

(d) processing the recovered modulating signal to determine the digital information encoded therein including the redundant bits;

(e) decoding the digital information by computing the redundant bit algorithm to produce a bit error signal;

(f) counting the bit error signals; and (g) selecting one of said feed-back loop paths at predetermined count thresholds within a selected time interval.

17. A method of communicating digitally encoded information by carrier suppressed electromagnetic transmission as claimed in claim 16 wherein the encoding algorithm is forward error correction.

18. A method of communicating digitally encoded information by carrier suppressed electromagnetic transmission as claimed in claim 16 wherein the encoding algorithm is convolution encoding.

19. A method of communicating digitally encoded information by carrier suppressed electromagnetic transmission as claimed in claim 16 wherein the decoding algorithm is viterbi decoding.

20. A method of communicating digitally encoded information by carrier suppressed electromagnetic transmission as claimed in claim 17 wherein the encoding algorithm is convolution encoding.

21. A method of communicating digitally encoded information by carrier suppressed electromagnetic transmission as claimed in claim 20 wherein the decoding algorithm is viterbi decoding.

22. A method of communicating digitally encoded information by carrier suppressed electromagnetic transmission as claimed in claim 17 wherein the decoding algorithm is viterbi decoding.

23. A method of communicating digitally encoded information by carrier suppressed electromagnetic transmission as claimed in claim 18 wherein the decoding algorithm is viterbi decoding.

* * * * *